United States Patent

Feldtkeller

[11] 3,906,343
[45] Sept. 16, 1975

[54] DIGITAL MAGNETO OPTICAL INSTRUMENT FOR HIGH VOLTAGE SYSTEMS

[75] Inventor: Ernst Feldtkeller, Munich, Germany

[73] Assignee: Siemens Aktiengesellschaft, Berlin & Munich, Germany

[22] Filed: June 27, 1974

[21] Appl. No.: 483,572

[30] Foreign Application Priority Data
June 29, 1973 Germany............................ 2333242

[52] U.S. Cl. .................. 324/96; 250/225; 350/151; 356/117
[51] Int. Cl.² .......................................... G01R 31/00
[58] Field of Search ....... 324/96; 250/225; 350/150, 350/151; 356/117

[56] References Cited
UNITED STATES PATENTS

| | | |
|---|---|---|
| 3,590,374 | 6/1971 | Evans et al. ........................... 324/96 |
| 3,662,263 | 5/1972 | Bensel.................................... 324/96 |
| 3,708,747 | 1/1973 | Lesueur ........................... 250/225 X |
| 3,769,584 | 10/1973 | Iten et al......................... 350/151 X |

*Primary Examiner*—Stanley T. Krawczewicz
*Attorney, Agent, or Firm*—Hill, Gross, Simpson, Van Santen, Steadman, Chiara & Simpson

[57] ABSTRACT

A digital magneto-optical instrument transformer for high voltage systems wherein polarized light is passed through a plurality of pairs of magneto-optical units with one of each pair having polarizers aligned at a certain angle and the other of each pair having polarizers aligned at a second angle. Light to electrical transducers are mounted adjacent the polarizers, and indicators are connected to each of the transducers to indicate *n*-place binary numbers which indicate the current in the high voltage system.

4 Claims, 1 Drawing Figure

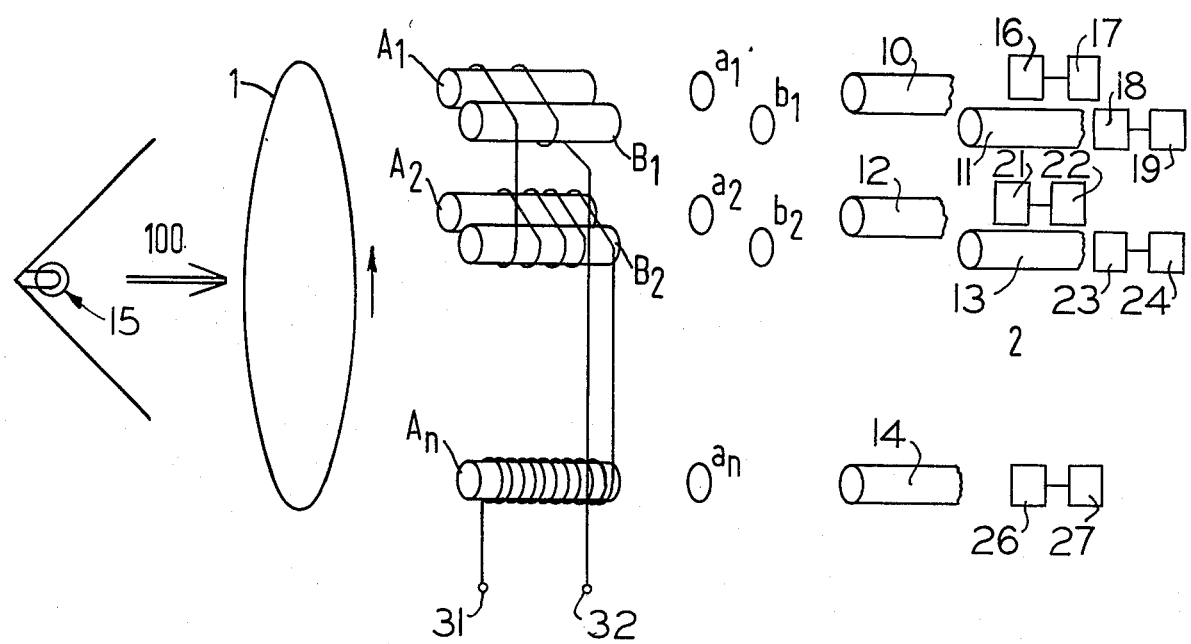

DIGITAL MAGNETO OPTICAL INSTRUMENT FOR HIGH VOLTAGE SYSTEMS

BACKGROUND OF THE INVENTION

Instrument transformers which utilize the Faraday magneto-optical effect are known and in which light is passed through a magneto-optical body in which the polarization direction of the light is rotated by the Faraday effect as a function of the strength of an applied magnetic field. This instrument has been used in high voltage systems, wherein the effect of the magnetic field which surrounds every conductor is utilized.

Magneto-optical instrument transformers have been constructed in which the Faraday rotation of a magneto-optical body which is at a high voltage is compared with the Faraday rotation of a magneto-optical body which is at ground potential. However, for this apparatus to successfully operate, extremely careful adjustments and calibrations must be made because the information derived from the polarization change by the magnetic field must not be lost or destroyed between the magneto-optical body which is at the high voltage and the body which is at ground potential. For example, because of the destruction of the polarization angle, multimode glass optical wave guides cannot be used in such systems.

Another possibility is to convert the Faraday rotation which is produced by the magneto-optical body at the high voltage to information indicative of light intensity using a polarizer operating as an optical analyzer. However, this results in a cosine relationship between current and light intensity; and where the measured values are large, in other words, where heavy currents are involved, an ambiguity exists between the current and light intensity. Also, when the measured values are small, in other words, at low currents, the light intensity is very weak and there is a very weak signal.

German Pat. No. 1,955,403 discloses a digital instrument for measuring currents in high voltage conductors. This instrument contains an optical device with an interferometer. Two coherent light beams are utilized and one is passed through an optical modulator whose refractive index changes as a function of the electro-optical or magneto-optical effect which is proportional to the current being measured. The interference fringes produced due to the interference between the two coherent light beams are counted and are a measure of the current.

SUMMARY OF THE INVENTION

The present invention comprises a digital magneto-optical instrument transformer, wherein radiant energy such as infrared light is polarized with a first polarizer and then is passed through a plurality of pairs of Faraday shift devices in which each pair is wound by differing number of turns of a winding through which the current to be measured is passed. A polarizer is mounted adjacent the output end of each Faraday rotator with the polarization of these polarizers oriented at different angles to the input polarizer. Transducers receive the light energy passing through the polarizers and convert the output into electrical signal indicative of digital numbers of either 0 or 1 depending upon whether the amplitude is more or less than one-half the maximum value. From the indicated output, the current can be determined.

An object of the invention is to provide a digital magneto-optical instrument transformer having an accuracy of measurement corresponding to 0.5" of the highest measurable value attainable by the instrument transformer.

The Faraday shift devices and the associated polarizers operate with infrared light because in this range of the optical spectrum, Faraday shifts or rotations can be accomplished which reach multiples of 180°.

The proportionality factor between the angle through which the plane of polarization of the light passing through the Faraday rotation device is rotated and the current can be adjusted by varying the number of turns in the coils surrounding the Faraday shift device or by varying the length of the magneto-optical member which comprises the Faraday shift device. In the instrument according to the present invention, the input to the channels including the Faraday shift devices and the associated two polarizers receive uniform light intensity at the input end. The intensity of the light at the output end of the channels is a measure of the function of the current being measured and the individual intensities at the output ends of the channels are converted into dual numbers.

The result is an n-place dual number with the $n^{th}$ place, in other words, the last place, will be either 1 or 0 depending upon whether the $A_n$ channel furnishes more than half the maximum possible light intensity or less than half the maximum possible light intensity, respectively. The $m^{th}$ place in the dual number (where $m < n$) will be either 1 or 0 depending upon whether the intensity produced by the $A_m$ channel is above a first threshold which is in turn made higher than half the maximum possible light intensity or whether the intensity is below a second threshold which is in turn made lower than half the maximum possible light intensity. If the intensity of the output light lies between these two thresholds, then by means of the channels containing Faraday shift devices $B_1 \ldots B_{n-1}$, the value of this place will be determined as follows:

Let it be assumed that for a specific current the intensity of the $A_i$ output is between the two above mentioned thresholds. The $i^{th}$ place in the dual number is 1 if the intensity furnished by the $B_i$ channel is greater than half the maximum possible light intensity and the $(i+1)^{th}$ place in the dual number is 0, or if the intensity produced by the $B_i$ channel is less than half the maximum intensity and the $(i+1)^{th}$ place is 1. In the reverse case, the $i^{th}$ place in the dual number is 0. The place values of the $m$-place dual numbers are thus determined consecutively commencing with the last place. The structure for making these determinations can be achieved using exclusive OR gates, for example.

Because the instrument transformer of the present invention has two groups of Faraday shift devices and accordingly two groups of channels, the above mentioned thresholds do not need to have particularly sharply defined values, in other words, the adjustment of the instrument transformer in accordance with the invention is extremely simple and the permissible tolerances of the adjustment are advantageously wide while still maintaining great accuracy of measurement.

Other objects, features and advantages of the invention will be readily apparent from the following description of certain preferred embodiments thereof, taken in conjunction with the accompanying drawing, although variations and modifications may be effected

3

BRIEF DESCRIPTION OF THE DRAWING

The FIGURE illustrates the novel instrument transformer of the invention.

DESCRIPTION OF THE PREFERRED EMBODIMENTS

A radiant energy source, for example, an infrared light source 15, supplies parallel rays of infrared energy 100 through polarizer 1 which polarizes the energy in a first direction, as for example, in the vertical direction, to a plurality of pairs of Faraday shift devices with one of each pair being designated $A_1 - A_n$ and the other of each pair being designated $B_1 - B_n$. A pair of input terminals 31 and 32 are connected to windings which extend around the Faraday shift devices $A_1 - A_n$ $B_{n1} - B_{n-1}$ with the windings being wound in series about the shift devices and the number of turns of the winding varying between each pair of Faraday shift devices. For example, as illustrated in the drawing, the pair of shift devices $A_1$ and $B_1$ have two turns of the winding and the pair of shift devices $A_2$ and $B_2$ are wound with four turns of the winding. The other shift devices not shown are similarly wound with increasingly large number of turns and the winding around $A_n$ has the most turns which makes it the most sensitive of the shift devices. The Faraday shift devices $A_1$ and $B_1$ are the least sensitive since they have the least turns. Mounted adjacent each of the shift devices $A_1 - A_n$ and $B_1 - B_{n-1}$ are polarizers $a_1 - a_n$ and $b_1 - b_{n-1}$. The angle of polarization of the $m^{th}$ of the polarizers $a_1 - a_n$ is at an angle $\phi_m$ and the angle of the $k^{th}$ of the polarizers $b_1 - b_{n-1}$ is the angle $\psi k$, measured against the polarization of the input polarizer. The angle $\phi_m$ is defined by the equation $$\phi_m = \frac{\pi}{2} - \frac{2^{n-m} - 1}{2^{n+2-m}} \pi$$

where $1 \leq m \leq n$. The angle $\psi k$ is equal to $\phi_k$ plus $(\pi/4)$ where $1 \leq k \leq n-1$.

Associated with each of the polarizers $a_1 - a_n$ and $b_1 - b_{n-1}$ are a plurality of optical wave guides designated by numerals 10, 11, 12, 13, and 14, respectively. Associated with the optical wave guide 10 is an intensity measuring instrument comprising a converter 16 which converts the light energy into an electrical output and which supplies an output to an indicator 17. Likewise, convertors and indicators are associated with each of the other optical wave guides and are designated respectively by numerals 18, 19, 21, 22, 23, 24, 26, and 27.

In operation, the light energy 100 passes through the polarizer 1 and is polarized in a first direction, then through the Faraday shift devices $A_1 - A_n$ and $B_1 - B_{n-1}$, then through the polarizers $a_1 - a_n$ and $b_1 - b_{n-1}$, respectively, then into the optical wave guide 10–14 and then into the convertors 16, 18, 21, 23, and 26 which provide outputs, respectively, to the indicators 17, 19, 22, 24, and 27. The output at the indicators comprises a dual number.

The Faraday shift devices may comprise paramagnetic flint glass or a premagnetized ferrimagnetic garnet crystal or some other magneto-optical material which has its easy plane disposed perpendicular to the direction of propagation of the light energy.

Since each pair of the Faraday shift devices $A_1 - A_n$ and $B_1 - B_{n-1}$ are provided with windings so that the windings between adjacent pairs has a relationship of 2:1, the rotation through each pair of the shift devices will be in the ration of 2:1. Also, since the orientation of the polarizers $a_1 - a_n$ and $b_1 - b_{n-1}$ differs in accordance with the equations given above and wherein the indicators 17, 19, 22, 24 and 27 indicate whether the radiation passed by the individual channels is above or below half the maximum possible intensity or whether the intensity is above a first threshold at the output of the polarizers $a_1 - a_{n-1}$ which is higher than half the maximum possible intensity or is below a second threshold which is below half the maximum possible intensity and the $n^{th}$ place in the dual measured being 1 or 0 depending upon whether the $A_n$ channel produces more than half the maximum light intensity or less than half the maximum possible light intensity and the $m^{th}$ place in the dual number where $m$ is less than $n$ being 1 or 0 depending upon whether the intensity produced by the $A_n$ is above the first threshold or below the second threshold and if the light intensity is between these two thresholds, the $B_1 \ldots B_{n-1}$ determining the value for a specific current which lies between the above mentioned thresholds and the $i^{th}$ place in the dual number is 1 where the intensity produced by the $B_i$ channel is more than half the maximum possible intensity and the $(i + 1)^{th}$ place in the dual number is 0 where the intensity produced by the $B_i$ channel is less than half the maximum intensity and the $(i + 1)^{th}$ place is 1 and where the $i^{th}$ place in the dual number is 0 in the other cases.

Thus, the present invention allows the current between terminals 31 and 32 to be accurately measured and although the invention has been described with respect to preferred embodiments, it is not to be so limited as changes and modifications may be made which are within the full intended scope as defined by the appended claims.

I claim as my invention:

1. A digital magneto-optical instrument transformer for high voltage systems in which two groups of Faraday shift devices are provided, comprising a first group with n Faraday shift devices $A_1 - A_n$ and a second group of n-1 Faraday shift devices $B_1 - B_{n-1}$, the devices $A_1 - B_1$ producing equal rotation as a function of current, and one of each group of Faraday shift devices having the same rotation angle, and each succeeding pair having rotation, as dependence at angles which are twice as great as the prior pair; and all the Faraday shift devices are mounted between a first and a second polarizer which have polarization planes which differ by an angle which in the case of the devices $A_m$ where $1 \leq m \leq n$ is $$\phi = \frac{\pi}{2} - \frac{2^{n-m} - 1}{2^{n+2-m}} \pi$$

and in the case of the devices $B_k$ where $1 \leq k \leq n - 1$ is $\psi_k = \phi_k + (\pi/4.)$ 2. A method of obtaining an $n$-place dual measured value using an instrument transformer as claimed in claim 1, wherein a light beam source provides light of the same intensity to a plurality of channels, each channel being formed by a first polarizer, a Faraday shift device and a second polarizer, and a measuring instrument for measuring light intensity indicative of the radiation passed by the individual channels, and a determination is made of whether the intensity of the radiation passed, after the polarizers, is above or below half the maximum possible intensity or whether, after the polarizers, the intensity is above a first threshold which is chosen to be higher than half the maximum possible intensity, or is below a second threshold which is below half the maximum possible intensity, the $n^{th}$ place in the dual measured value being 1 or 0, depending upon whether the $A_n$ channel produces more than half the maximum possible light intensity or less than half the maximum possible light intensity, the $m^{th}$ place in the dual number (where $m < n$) being 1 or 0, depending upon whether the intensity produced by the $A_m$ channel is above the first threshold or below the second threshold, and, if the light intensity is between these two thresholds, the $B_m$ channel being used to determine the value of the place, in such a fashion that for a specific current for which the intensity produced by the $A_i$ channel lies between the above mentioned thresholds, the $i^{th}$ place in the dual number is 1 where the intensity produced by the $B_i$ channel is more than half the maximum possible intensity and the $(i+1)^{th}$ place in the dual number is 0, or where the intensity produced by the $B_i$ channel is less than half the maximum intensity and the $(i+1)^{th}$ place is 1; and in that the $i^{th}$ place in the dual number is 0 in the other cases.

3. A digital magneto-optical instrument for measuring current, comprising a light energy source, a first polarizer receiving said light energy and polarizing the energy in a first direction, a plurality of pairs of light shift devices mounted so as to receive the polarized light energy from said first polarizer, an electrical conductor series wound about said plurality of pairs such that the number of turns between different pairs has a ratio of one to two in progression, a first plurality of polarizers mounted to receive the light energy after it has passed through one of each pair of light shift devices and the $m^{th}$ of said first plurality of light polarizers having its axis of polarization at an angle with said first direction of $$\phi = \frac{\pi}{2} - \frac{2^{n-m} - 1}{2^{n+2-m}} \pi$$

where $1 \leq m \leq n$ and a second plurality of light polarizers mounted to receive the light energy after it has passed through the other of each pair of light shift devices and the $k^{th}$ of said second plurality of light polarizers having its axis of polarization at an angle with said first direction of $\psi_k = \Phi_k + (\pi/4)$, and a plurality of detecting means mounted adjacent said first and second plurality of polarizers to indicate the current through said conductor.

4. A digital magneto-optical instrument according to claim 3 wherein said detecting means indicate whether the energy passing said shift devices is above or below a threshold.

* * * * *